United States Patent [19]
Wöste

[11] Patent Number: 4,466,102
[45] Date of Patent: Aug. 14, 1984

[54] MODULAR DYE LASER

[75] Inventor: Ludger H. Wöste, Ecublens, Switzerland

[73] Assignee: Lexel Corporation, Palo Alto, Calif.

[21] Appl. No.: 265,699

[22] Filed: May 21, 1981

[51] Int. Cl.³ .............................................. H01S 3/20
[52] U.S. Cl. ..................................... 372/53; 372/107; 372/93
[58] Field of Search ....................... 372/54, 51, 92, 94, 372/65, 53, 93, 107; 356/350

[56] References Cited

U.S. PATENT DOCUMENTS

| | | | |
|---|---|---|---|
| 3,382,758 | 5/1968 | Wang | 356/350 |
| 3,382,759 | 5/1968 | Macek | 356/350 |
| 3,480,878 | 11/1969 | Macek | 356/350 |
| 3,486,130 | 12/1960 | Macek | 356/350 |
| 3,647,303 | 3/1972 | Kramer, Jr. | 356/350 |
| 3,826,575 | 7/1974 | Walter, Jr. | 356/350 |
| 4,110,045 | 8/1978 | Smith, Jr. et al. | 356/350 |
| 4,194,168 | 3/1980 | Jarrett et al. | 372/22 |
| 4,229,106 | 10/1980 | Dorschner et al. | 356/350 |

Primary Examiner—William L. Sikes
Assistant Examiner—Leon Scott, Jr.
Attorney, Agent, or Firm—C. Michael Zimmerman

[57] ABSTRACT

A dye laser is described that has an optical resonator structure which is modular in construction. The resonator includes a first base plate that has all of the optical elements typically found in a basic linear dye laser. A second base plate is rigidly securable to the first base plate to extend the resonator structure for either ring operation or for more differing linear dye laser configurations. The second base plate can include those optical elements required to cooperate with the optical elements on the first base plate to provide ring operation. Additional and differing modular units can be provided and secured to the two base plates making up the optical resonator structure to satisfy many different criteria. Moreover, a third base plate is rigidly securable between the first two base plates to further extend the resonator structure as desired.

13 Claims, 13 Drawing Figures

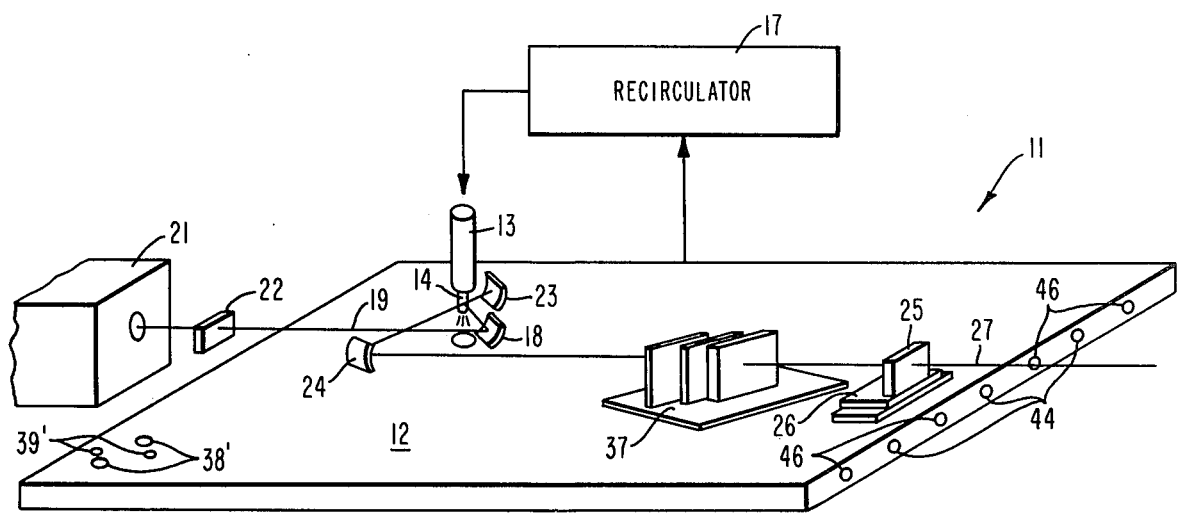
FIG_1
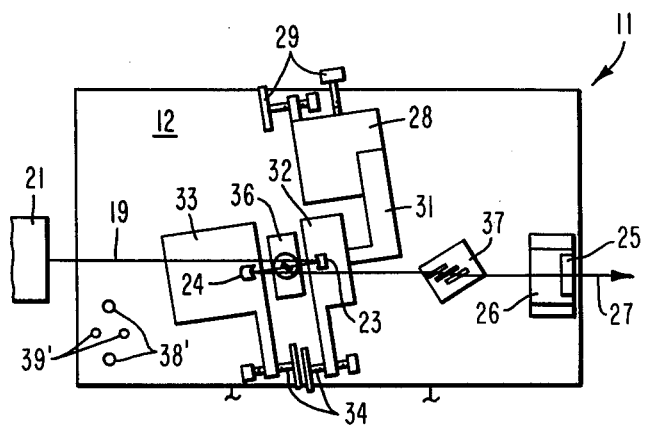
FIG_2
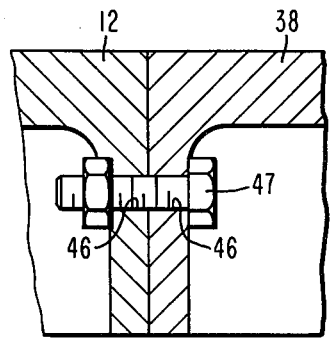
FIG_4
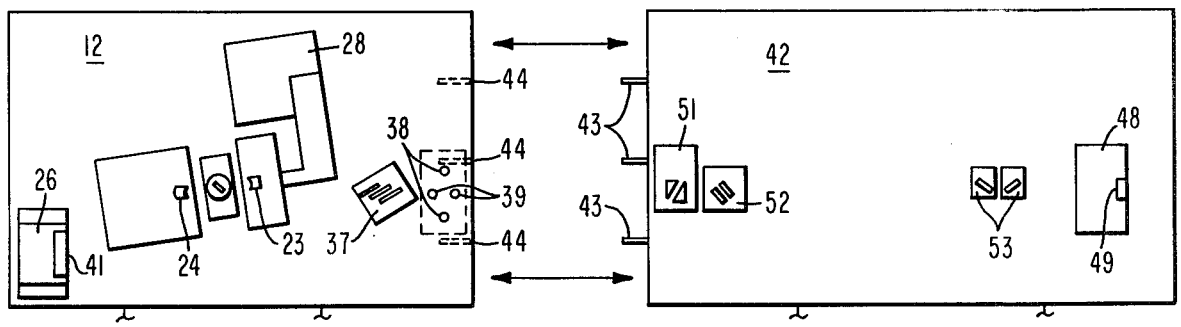
FIG_3

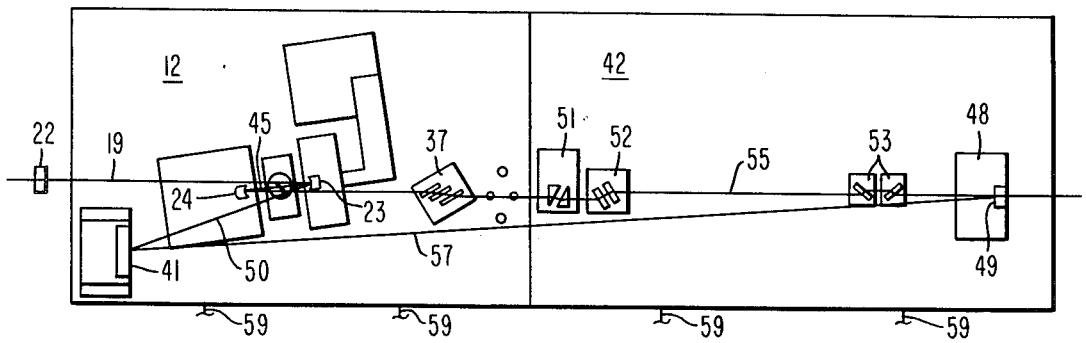
FIG_5
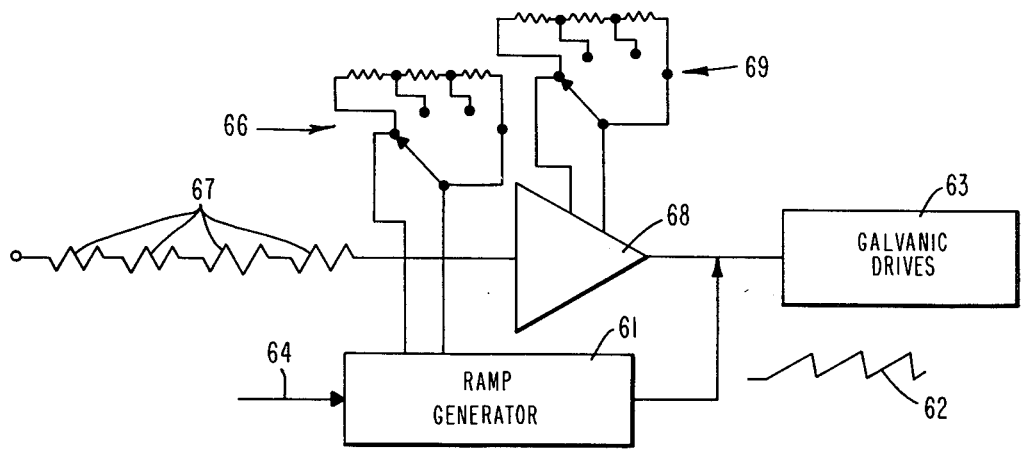
FIG_6
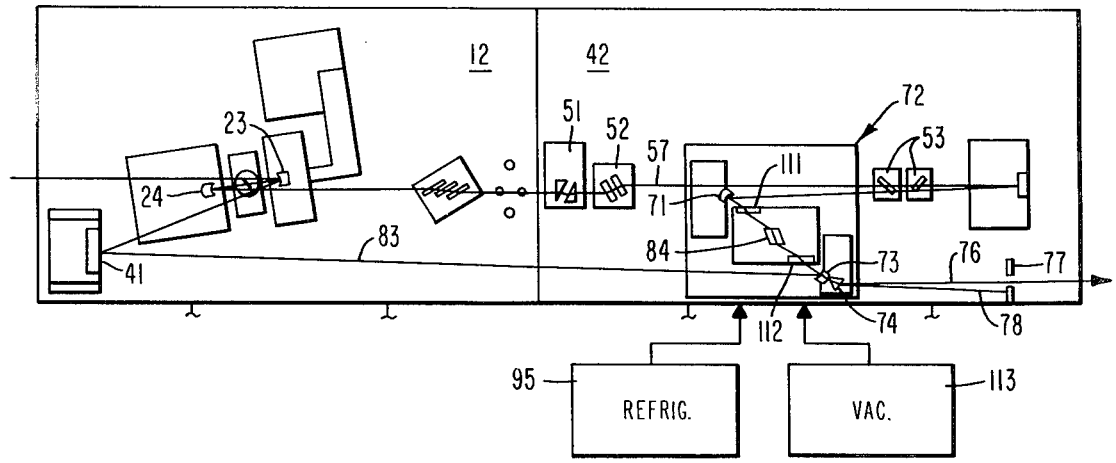
FIG_7

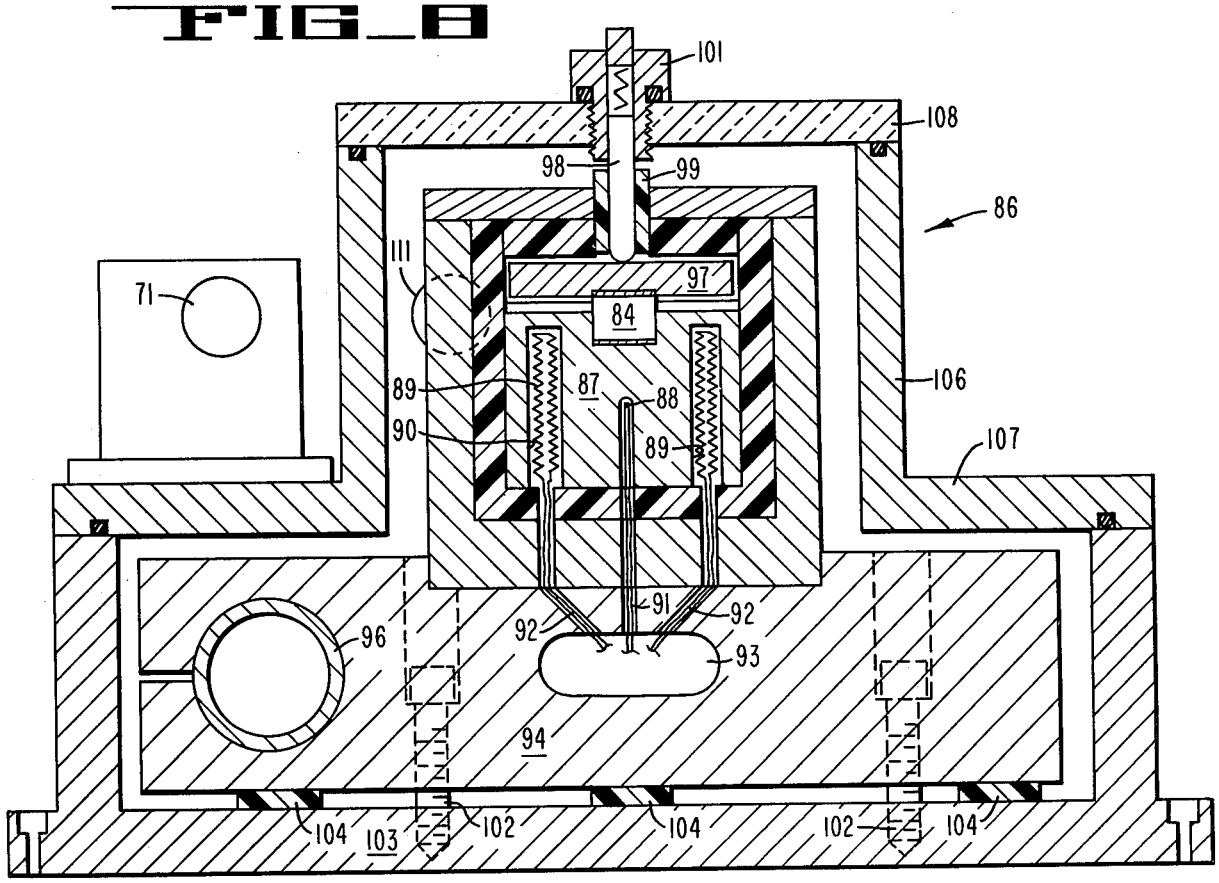
FIG_8
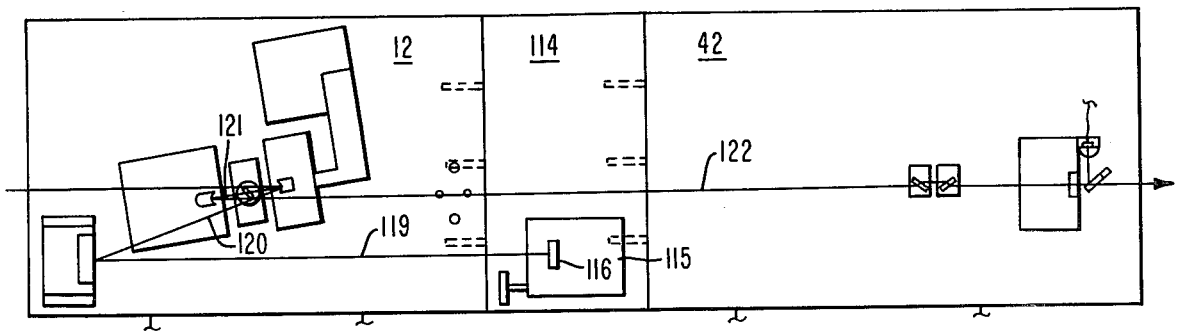
FIG_9
FIG_10

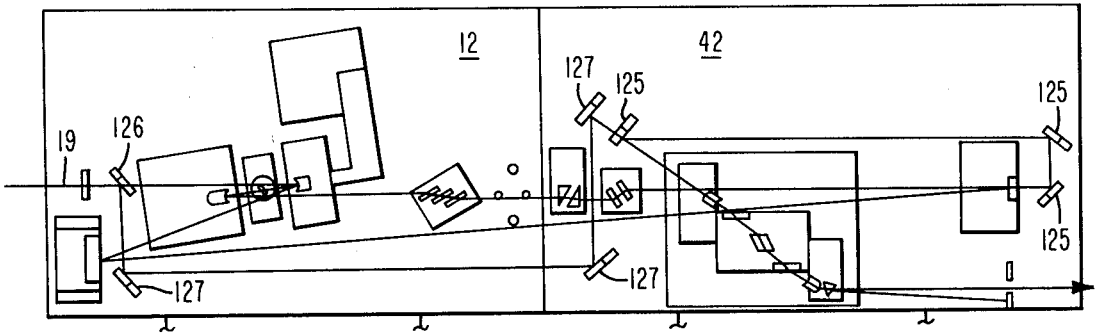
FIG_11
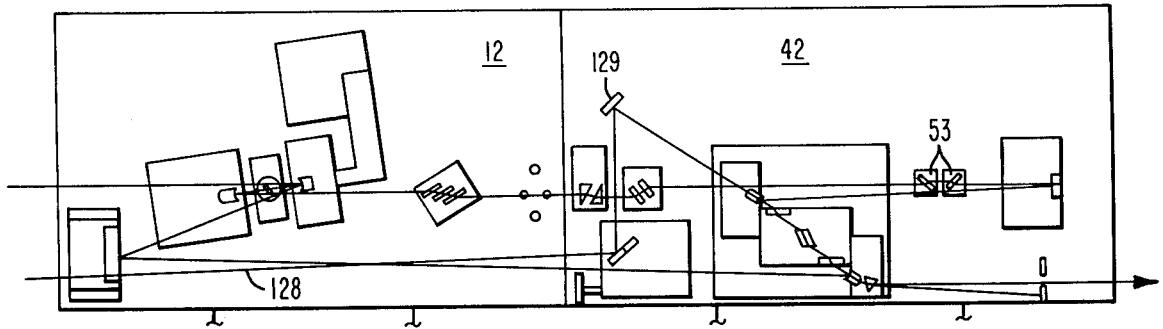
FIG_12
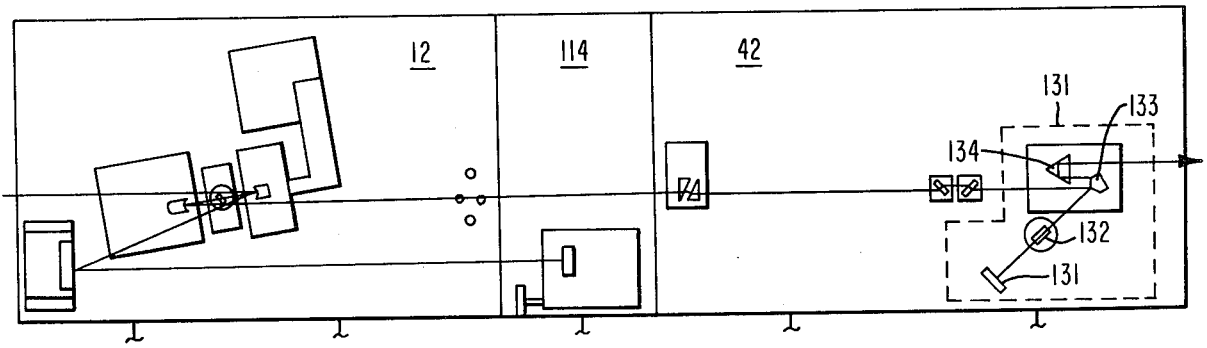
FIG_13

MODULAR DYE LASER

DISCLOSURE

BACKGROUND OF THE INVENTION

The present invention relates to lasers and, more particularly, to a dye laser having a multiple number of features, including that of modular construction, providing the capability of conversion from linear to ring operation.

In recent year, dye lasers have attracted much attention as a research tool because of their ability to provide coherent radiation over a comparatively large segment of the optical radiation spectrum. As used herein, "optical radiation" is meant to encompass electromagnetic radiation in the visible portion of the spectrum as well as that in the ultra-violet and near infrared portions capable of lasing operation in typical laser optical cavities.

While dye lasers are becoming more frequently used, they suffer from several draw backs. For example, most dye lasers now available either have a linear or ring (closed loop) optical cavity and are incapable of being converted from linear to ring operation, or vice versa. Moreover, most dye lasers now available are relatively limited with respect to the number of different kinds of operations which can be conducted intracavity of the same. This is becoming increasingly frustrating to researchers desirous of utilizing the broad spectrum capabilities of dye lasers to obtain coherent radiation for such analytical endeavors as optical spectroscopy.

SUMMARY OF THE INVENTION

The present invention provides an extremely versatile dye laser arrangement having numerous unique features. One of its major features is that it is modular in construction. In this connection, it is capable of conversion between linear and ring operation, and vice versa. Moreover, numerous, different dye laser configurations can be easily constructed with the same to obtain different coherent radiation effects as desired.

The modular nature of the invention basically is achieved by making modular the optical resonator structure, i.e., the structure which maintains the optical reflectors which define an optical cavity in a set relationship to one another. To this end the dye laser of the invention has a first base plate upon which is mounted a pair of optical reflectors respectively on opposite sides of a location at which a liquid dye is made to fluoresce, to reflect optical radiation emitted by such liquid dye. The mounting means for such optical reflectors are adjustable in orientation relative to one another between a first position in which the optical path between the reflectors defines a straight line radiation path leg of a linear laser cavity and a second position in which the reflectors cooperate with at least one other reflector to define a closed loop laser optical cavity. Most desirably, the base plate is provided with two different locations upon which a mount for an optical reflector can be provided. At one of such locations a totally reflective reflector is mountable to cooperate with the pair of reflectors defining a closed loop cavity as stated. At the other location, the holder can position a partially transmissive optical reflector to provide an output beam for the dye laser when it is in the linear mode.

Most desirably, a second base plate is provided which is rigidly securable to the first base plate in a predetermined relationship to extend the optical resonator structure. This second base plate provides additional space area for mounting other optical elements, including a reflector which cooperates with the reflectors on the first base plate to define the closed loop laser optical cavity. And as will become apparent from the following description of a preferred embodiment, numerous different optical configurations can be provided because of the modular construction of the instant invention. Thus, one utilizing a dye laser incorporating the instant invention for scientific endeavors can choose dye laser configurations and/or frequency outputs most suitable for the particular use to which the dye laser is being put.

The dye laser of the invention includes other features which are also quite desirable. For one, it includes means for compensating for the effect on the length of an optical cavity, of temperature changes or variations in the optical resonator structure. To this end, it includes means such as conventional galvonometers for changing the path length of lasing radiation in the optical cavity, and means such as a plurality of thermal couples for detecting thermal changes in the optical resonator structure. Feedback means are also included for controlling the cavity length changing means to cause the cavity length corrections necessary to compensate for variations in cavity length caused by thermal changes detected in the optical resonator structure.

As another feature of the invention it includes a frequency doubling arrangement which keeps the number of optically transmissive elements which must be traversed by the radiation in order to cause such frequency doubling. A frequency doubling crystal is positioned to intercept the lasing radiation either intraor extra-cavity, and a housing structure is provided for hermetically isolating its input and output faces from the ambient atmosphere. Moreover, means are provided for evacuating the hermetic isolation means to provide vacuum isolation of such fases. While in the past, inert gas environments have been provided to isolate the faces, it has been found that both thermal and electrical isolation of such face can be achieved with sufficiently low vacuum levels. This can be achieved without deleterious "fogging" of the input faces as one would typically expect if the crystal is being cooled.

As one other feature of the instant invention, it is arranged to facilitate the removal, insertion, or adjustment of those optical elements typically found in ring lasers, that change the path of lasing radiation. That is, all of such optical conditioning devices are located in the same straight line radiation path leg of the closed loop cavity. Thus, in general, any change caused by one of such devices will only affect such leg and will not require significant adjustments in other legs to once again provide the proper conditions for lasing operation.

The above and other features and advanatages will be described or will become apparent from the following, more detailed description of a preferred embodiment of the invention.

BRIEF DESCRIPTION OF THE DRAWING

With reference to the accompanying four sheets of drawing;

FIG. 1 is a schematic, isometric view of a preferred embodiment of the invention arranged as a linear dye laser;

FIG. 2 is a schematic plan view of the arrangement illustrated in FIG. 1;

FIG. 3 is a schematic plan view illustrating conversion of the arrangement illustrated in FIG. 2, to an extended linear or ring configuration;

FIG. 4 is an enlarged sectional view illustrating the manner in which the pair of base plates are rigidly secured together for the conversion represented in FIG. 3;

FIG. 5 is a schematic plan view illustrating a single configuration reflective both of a ring laser embodiment of the invention and the linear laser embodiment of FIGS. 1 and 2 converted for ring operation;

FIG. 6 is a schematic and block diagram representation of a temperature compensation circuit of the invention;

FIG. 7 is a schematic plan view illustrating the preferred embodiment of the invention converted to providing frequency doubling;

FIG. 8 is an enlarged, sectional schematic view of a frequency doubling crystal and housing therefor;

FIG. 9 is a schematic plan illustration of the preferred embodiment of the invention converted for mode locked operation;

FIG. 10 is a schematic plan representation of the preferred embodiment of the invention converted to provide both mode locked operation and extra-cavity frequency doubling;

FIG. 11 schematically illustrates in plan a layout provided by the preferred embodiment of the instant invention for extra-cavity frequency mixing;

FIG. 12 is a schematic plan showing of an intracavity frequency mixing arrangement which can be provided by the preferred embodiment of the invention; and FIG. 13 is a schematic plan illustration of the preferred embodiment of the instant invention converted for both mode locked and cavity dumping operation.

DETAILED DESCRIPTION OF THE PREFERRED EMBODIMENT

The present invention is incorporated in a preferred embodiment which is quite versatile. Because of its modular construction, it lends itself to many different combinations and operations. FIGS. 1 and 2 schematically illustrate those aspects of the preferred embodiment of the invention providing a basic dye laser having a linear cavity. The resonator structure is made up of a first base plate 12 upon which are mounted the typical mechanisms and optics of a basic linear dye laser. More particularly, means are included for furnishing a liquid dye capable of lasing to a selected location contiguous to the base plate. In this preferred embodiment, such means takes the form of a nozzle 13 which directs a free-flowing jet stream of dye through the selected location. The dye stream then flows through an aperture, represented at 16, in the base plate, to be collected and fed to a recirculator 17 for recirculation through nozzle 13.

Means are also provided on base plate 12 for focusing to the selected location, a beam of pumping radiation capable of creating a population inversion in the dye. More particularly, a focusing mirror 18 is positioned to reflect a beam 19 of coherent radiation to its focal point, positioned at the selected location on the dye stream. Beam 19 is emitted by a gas ion laser, partially shown at 21. A polarization rotator is represented at 22 for intercepting beam 19 and rotating its plane of polarization 90° prior to the beam impinging upon mirror 18.

As is known, impingement of a focused beam of coherent radiation on a well defined stream of a selected dye, can result in the dye fluorescing. And the optical radiation emitted from the same can be made to lase by the positioning of optical reflectors to cause appropriate feedback of stimulated emission of optical radiation. In this connection, a pair of optical reflectors or mirrors 23 and 24 are mounted on the base plate respectively on opposite sides of the selected location to reflect optical radiation emitted by the liquid dye. Reflectors 23 and 24 are totally reflective, i.e., they reflect essentially all optical radiation at the appropriate wavelength, impinging upon the same. While reflector 23 is oriented to return to reflector 24 any radiation which impinges upon the same, reflector 24 is oriented to direct radiation toward another optical reflector represented at 25. Reflector 25 is mounted on base plate 12 by a reflector holder 26 and is partially transmissive to provide a dye laser output beam 27.

It will be apparent to those skilled in the art, that the mirrors 23, 24, and 25 define a folded two-legged, optical cavity of a linear dye laser. That is, such mirrors provide continual, resonant passage through the fluorescing portion of the dye stream, of optical radiation emitted by such dye stream to cause lasing. It should be noted that a linear laser could operate with only one optical cavity leg.

While in FIG. 1 the mounting structure for the mirrors 18, 23, and 24 are omitted for the sake of clarity, such mounts or holders are represented in FIG. 2. The holder for mirror 18 includes a block 28 mounted on base plate 12 for limited position adjustment as represented by adjusting bolts 29, to facilitate the positioning of mirror 18 for proper focus. An angle arm 31 projects from block 28 and extends beneath a mount 32 for mirror 23, to thereby position mirror 18 beneath mirror 23. Another reflector mount or holder 33 is provided for mirror 24, and the positions of both of the mounts 32 and 33 relative to the base plate 12 are adjustable as represented by the adjustment screws 34.

A holding structure for the nozzle 13 is also included in FIG. 2, represented at 36. Moreover, means are mounted on base plate 12 to intercept optical radiation in the optical cavity and narrow its bandwidth. Such means most desirably is adjustable to select a predetermined bandwidth range in the spectrum of lasing radiation provided by the dye. That is, a birefringent filter 37 of the type described, for example, in U.S. Pat. No. 3,868,592 and having three birefringent plates, is positioned in the path of resonating energy reflected between mirrors 24 and 25.

It will be recognized by those skilled in the art, that with the above arrangement the output beam 27 will be coherent energy having a frequency within a predetermined range. It is important to note that with the dye laser configuration described, the output beam 27 will be generally parallel to the input pumping beam 19. This parallel relationship facilitates optional alignments in many experimental arrangements in which a dye laser is to be used.

As previously mentioned, a major feature of the instant invention is its ability to convert from linear operation as described, to ring operation. As used herein, the term "ring" as applied to a dye laser refers to closed loop optical cavity dye laser operation. FIGS. 3 and 4 illustrate such conversion. As part of such conversion, the reflector holder 26 and its reflector 25 is removed from its position on base plate 12. In this connection, the reflector holder is most desirably selectively removable by having extending through its base a pair of threaded bolts which respectively register with threaded holes 38 in base plate 12. The base of holder 26 is also provided with a pair of downwardly projecting locating pins which are received within locating cavities 39. (Holder 26 is shown in phantom in FIG. 3 at the location in which it is removed.)

Holder 26 is relocated on base 12 to a position a fully reflective optical reflector for ring laser operation. That is, the bolt holes and locating pins on the base of the holder are registered with corresponding holes and cavities 38' and 39' (see FIG. 2) on the opposite side of the mirrors 23 and 24. This new position is shown in full in FIG. 3, with a fully reflective optical reflector 41 positioned by such holder.

A second base plate 42 is provided which is rigidly securable to base plate 12 in a predetermined relationship therewith. For this purpose, one of the shorter ends of base plate 42 has a plurality of locating pins 43 extending therefrom, which are receivable within corresponding pin cavities 44 in plate 12. Each of the plates 12 and 42 have bolt holes 46 which mate when such plates are brought together with pins 43 received within cavities 44, to enable rigid securance together of such plates via bolts 47. When base plate 42 is so rigidly secured to base plate 12, it extends the resonator structure of the dye laser along the path of optical radiation reflected by the optical reflector 41.

Base plate 42 is provided with those optical elements typically included as a part of a basic ring dye laser, but which are not mounted on base plate 12. That is, it includes another reflector holder 48 which positions a partially transmissive optical reflector 49 at a proper location to cooperate both with the reflector 41 and with the reflector 24 to provide a closed loop ring cavity and also an output beam for the resulting ring. An etalon for mode selection is schematically illustrated at 51. While various etalons are available and can be used for this purpose, it is preferred that etalon 51 be an adjustable one such as is described in U.S. Pat. No. 4,097,818. an optical device, forcing the light at single frequency to propagate only in one direction is also represented at 52. A suitable unidirectional arrangement for this purpose is described in U.S. Pat. No. 4,194,168.

A pair of galvanometer plates represented at 53 are also mounted on plate 42 at a position to intercept lasing radiation within the optical cavity of a closed loop arrangement. As is known, adjustment of the angular relationship of the plates 53 relative to the path of lasing radiation will result in changing the length of such path. A circuit is provided for varying the angular relationship of such plates to the beam path in order to obtain a desired output frequency.

FIG. 5 illustrates both the resulting arrangement when a linear dye laser of the invention as described above is converted to ring operation, and a basic ring dye laser of the invention. It also illustrates the beam path in both of such arrangements. In this connection, it is to be noted that the closed loop optical cavity includes four different legs; leg 45 extending between the mirrors 23 and 24, legs 50 and 55 extending respectively between the reflector 23 and reflector 41 and between reflector 24 and reflector 49, and leg 57 extending between reflector 41 and 49. These legs of the closed loop optical cavity are in addition to the path 19 of pumping optical radiation.

The simplicity with which a linear dye laser of the invention is converted to ring operation should be readily apparent from the above. For such conversion it is only necessary to remove the output reflector or mirror 25 and its associated mount 26, and use such mount or another mount to position a totally reflective mirror 41 at the location described; and secure rigidly together, the two base plates 12 and 42. These operations are relatively simple ones which can be successfully completed in the field by customers. Thus, the instant invention enables a linear dye laser purchased by a customer to be converted to ring operation, making it unnecessary for such customer to have two different dye lasers in stock. In this connection, dye lasers are relatively expensive. It is not unusual for a customer to be able to afford a linear dye laser at one time and then later be desirous of obtaining ring operation. In the past it has been necessary for such customer to replace its linear dye laser with a ring laser, thereby obsoleting the initial investment in a linear dye laser. With the instant invention, however, the linear dye laser and all of its attendant optics is not obsoleted. That is, all of its optics except for the output mirror 25 is utilized to provide ring operation. The duplication of such optics and the waste inherent in the same is avoided.

The modular nature of the invention is also quite important from the manufacturing standpoint. The manufacturer can easily respond to an order for either a linear dye laser or a ring laser, by supplying respectively only the base plate 12 and its attendant optics, or a combination of the base plate 12 and base plate 42 and their attendant optics, respectively. Thus, the manufacturer need not construct and have in inventory, separate linear and ring dye laser arrangements.

The embodiment of the invention illustrated in FIG. 5 has other features which are quite advantageous but can find use other than in a modular arrangement. For one, the optical conditioning devices (the birefringent filter 37, the etalon 51, the unidirectional device 52, and the galvanoplates 53) are all located within the optical cavity to minimize the deleterious effect the insertion, replacement, or adjustment of any might have on the capability of the optical cavity to produce lasing radiation at a desired frequency. Each of such devices offset or otherwise change the path of radiation which otherwise would extend between the optical reflectors.

It will be noted that all of such optical conditioning devices are located in the single leg 55 of the closed loop optical cavity. This location in a single leg facilitates tuning and position adjustments that have to be made whenever one of such elements is adjusted, removed, or replaced. It is only such leg which is affected and requires adjustment.

Means are also incorporated in the embodiment shown in FIG. 5, for compensating for any deleterious effects on the beam path length caused by thermal changes in the optical resonator structure provided by the two base plates. Such means includes thermocouples or other temperature detecting means embedded within each of the base plates 12 and 42. Such thermocouples are represented in FIG. 5 by leads 59, and cooperate with the galvanoplates 53 to cause the desired compensation in the cavity length. FIG. 6 illustrates temperature compensation circuitry for this purpose. In accordance with conventional practice, the circuitry includes a scan or ramp generator 61 which furnishes a current signal having a wave form as represented at 62 to the drives for the galvanometers represented at 63.

The purpose of feeding a ramp signal to the galvanic drives 63 is to enable a user of the dye laser to obtain an output beam which scans through a predetermined frequency range. In this connection, in accordance with conventional practice, ramp generator 61 is controllable by an external command, as is represented by input line 64. The slope of the ramp is also adjustable externally by an appropriate switch as is represented at 66. The thermocouples in the base plates are represented in FIG. 6 by the series related resistances 67. The resistance to current flow provided by each thermocouple will be directly dependent upon the temperature of each and, hence, of the temperature of the base plate at its location. A source of DC power is supplied to such series related resistances, with the result that the combined resistance to current flow provided by the same will be impressed upon an amplifier 68. The amplifier output is superimposed on the output of the ramp generator 61 to thereby offset the same by a DC level directly proportional to the combined resistance provided by the thermocouples 67 and, thus, directly proportional to the integrated temperature of the resonator structure reflected by the thermocouples 67. It should be noted that the gain of amplifier 68 is adjustable depending upon the number of thermocouples responsible for its input. This gain adjustment is represented in FIG. 6 by resistance switch bank 69.

It should also be noted that the above arrangement provides temperature compensation both longitudinally and transversely of the resonator structure defined by the base plates, irrespective of the location of the temperature detecting means. That is, since the optical cavity is a closed loop, it is the overall cavity length which must be adjusted in order to accommodate for temperature changes. And temperature changes will be detected wherever the thermocouples are placed. It should further be noted, however, that the accuracy of the temperature compensation is directly dependent upon the number of thermocouples utilized. In one exemplification of the preferred embodiment of the invention, two thermocouples are provided for each base plate.

The modular construction of the instant invention enables differing linear and closed loop beams paths to be provided as desired, depending upon the particular accessory optical elements utilized with the invention. FIG. 7 illustrates a second closed loop optical cavity arrangement including means intracavity to obtain frequency doubling. Such a frequency doubling means is often used with dye lasers in order to obtain ultraviolet radiation. With reference to such figure, it will be seen that a reflector 71 is positioned to intercept radiation on the beam path providing leg 57 in FIG. 5, and direct the same through frequency doubling means represented at 72. The output from such frequency doubling means is directed to a specially coated mirror 73 which reflects the fundamental wavelength and transmits the generated ultraviolet frequency radiation. The reflected portion of the beam impinging on reflector 73 is directed to reflector 41 for deflection along leg 50 to provide a closed loop optical cavity. The portion of the frequency doubled radiation transmitted by the reflector 73 forms the output beam of the dye laser. This portion is fed through a frequency discrimination means represented in FIG. 7 by prism 74 to segregate the frequency doubled radiation from residual fundamental frequency. The frequency doubled portion is directed as represented by beam 76 through a slit aperture 77 to form the output beam, whereas the fundamental frequency radiation represented by beam 78 is intercepted by the structure of the slit aperture.

It will be seen from the above that the leg 57 shown in the FIG. 5 closed loop optical cavity arrangement has been replaced by legs 82 and 83 and the frequency doubling means 72. And this can be simply accomplished in the instant invention merely by adjusting mirrors and appropriately positioning the frequency doubling arrangement.

Frequency doubling typically is achieved by passing radiation at the fundamental frequency through a frequency doubling crystal, as is represented in FIG. 7 by crystal 84. The particular crystal selected for frequency doubling will depend on the frequency of the radiation to be doubled. For example, ammonium dehydrogen arsonate (ADA) crystals have been used as the frequency doubling medium to generate UV frequencey radiation from lasing radiation produced from rhodamine 6G dye.

It will be noted from FIG. 7 that frequency doubling arrangement 72 is intracavity. This location provides a radiation having a higher field strength for doubling than a location extracavity. However, an intracavity location of such an arrangement can deleteriously affect the power output of the dye laser. That is, an intracavity location will result in all lasing radiation within the cavity passing through the frequency doubling arrangement. Any significant loss through absorption, reflection, or scattering of such lasing radiation will reduce the ability of the dye laser to sustain lasing.

As one of the major features of the instant invention, frequency doubling arrangement 72 is designed to minimize unwanted radiation loss due to optically transmissive elements. FIG. 8 illustrates the frequency doubling crystal and its support structure in more detail. With reference to FIG. 8, the frequency doubling crystal 84 is shown mounted within a housing 86 which isolates the same from the external environment. The frequency of doubling operation of crystal 84 is controlled by a combination thermal and electro-optic mechanism. More particularly, such crystal is resiliently cushioned and positioned within a cavity in an electrically and thermally conductive block 87. Block 87 has located within it, a bore 88 for a thermocouple and a pair of bores 89 for electrically resistive heating elements 90. Such bores are in registration with corresponding cavities 91 and 92, respectively, which communicate with a lead cavity 93 in a heat sink block 94. A source of a refrigerant represented in FIG. 7 by block 95, is placed into good thermal contact with heat sink block 94, as is represented by cold probe 96 extending through a cylindrical cavity in such block. Heat sink block 94 and block 87 cooperate to regulate the temperature at which the crystal 84 is maintained. Block 94 and, hence, block 96 are cooled to a relatively low temperature by cold probe 96, and resistance heating elements 90 within the block 87 maintain such block adjacent the crystal 84 at the temperature required for the desired frequency. A thermocouple located in cavity 88 provides the necessary temperature detection for appropriate regulation.

Means are furnished for fine tuning the frequency of operation of crystal 84. That is, such crystal is electro-optically tuned as described, for example, in U.S. Pat. No. 3,524,147. Because the block 87 is electrically conductive, it acts as one electrode to impress on crystal 84, the electric field necessary for such fine tuning. The other electrode is provided by a plate 97 in intimate engagement with the upper surface of such crystal. A spring loaded electrical contact 98 is electrically insulated from the housing 87 by a bushing 99 and passes hermetically into the interior of housing 86 via a feed-through 101.

The assembly of the crystal, block 87, and heat sink block 94 are supported within housing 86 in a thermally and electrically insulated manner. That is, the crystal and block 87 are suitably secured to the heat sink block 94 and such heat sink block is in turn secured via nylon or other insulating screws 102 to the base 103 of the housing 86. Spacers 104 of a thermal and electrical insulating material such as nylon are positioned between block 94 and base 103.

As previously mentioned, housing 86 isolates crystal 84 from the ambient atmosphere. The base 103 of such housing includes an upstanding wall 104 which circumscribes the block 94. Housing 86 further includes an intermediate section 106 circumscribing block 87, which has an outwardly extending flange 107 hermetically sealed to the wall 104. A cap 108 through which the lead passthrough 101 extends, hermetically closes the upper end of such intermediate section. As is represented in FIG. 7, housing 86 includes a radiation entrance window 111 and exit window 112. The entrance window is also indicated in FIG. 8 and is positioned in the path of optical radiation reflected from reflector 71 toward crystal 84. Window 112 is similarly positioned to receive radiation leaving crystal 84 and allow the same to exit the housing for impingement on reflector 73.

As far as is known, intracavity frequency doubling arrangements provided in the past have not been capable of utilizing electro-optic tuning. A high voltage must be applied across a crystal in order to achieve such tuning and a major difficulty overcome by this invention is electrical insulation of the crystal faces both from the external environment and from each other without the necessity of passing the lasing radiation through a multiple number of transmission surfaces. It has been found that a vacuum will provide both thermal and electrical isolation without the "fogging" of the input and output faces of the crystal 84 when it is being cooled which might be expected. The degree to which housing 86 must be evacuated depends on many factors including the amount of voltage used, the geometrical arrangement, etc. As a practical matter the pressure within the housing should be reduced to at least about $10^{-4}$ torr. A higher vacuum, e.g., $10^{-5}$ torr or better, provides better electrical insulation. A vacuum pump as is represented in FIG. 7 by block 113 is suitably connected to housing 86 to enable such evacuation of the same. The cooled block filled with molecular sieve provides further pumping capacity. Thus, only two optical elements, windows 111 and 112, need be inserted within the optical cavity to allow crystal 84 to be electro-optically tuned.

Numerous other linear and closed loop cavity arrangements for dye lasers can be provided by the instant invention in view of its modular construction. FIG. 9 illustrates a mode locked, linear dye laser arrangement. It utilizes not only both of the base plates 12 and 42, but also an additional, intermediate base plate 114 in order to adapt the dye laser cavity length to the pump laser. Such third base plate includes at its respective edges appropriate locating pins, locating cavities, and registering bolt holes to allow the same to be rigidly secured between plates 12 and 42.

Base plate 114 further extends the base surface of the optical resonator of the dye laser. This provides intracavity work space. Moreover, it enables various combinations of various accessories usable with the invention, without the same interfering physically with one another.

The linear, mode locked laser of FIG. 9 includes many of the optical elements which have been previously described. It further includes a reflector mount 115 on plate 114 to position a totally reflective reflector 116 to intercept lasing radiation reflected from reflector 41. Such laser further includes at the beam output, a sampling mirror 117 and a photosensor 118 for the production of a feedback signal to obtain fine cavity length adjustment with the galvanoplates 53.

The linear cavity of the dye laser in FIG. 9 is defined by the beam path legs 119, 120, 121, and 122. As is known, the output of a dye laser can be conditioned to provide a predetermined frequency mode by appropriate pumping with a mode locked pulse and selection of the dye laser cavity length. In this connection, reflector holder 115 is mounted on plate 114 for adjustment of the position of reflector 116 as desired to enable gross adjustment of the length of the linear cavity.

FIG. 10 illustrates a linear dye laser providing both mode locking and extracavity frequency doubling. The reflector holder 115 for the fully reflective reflector 116 provided for mode locking is again mounted on an intracavity work space plate 114. Most desirably, the reflector holder 116 is mounted on plate 114 for adjustment of its position relative to the beam path. The frequency doubling arrangement included in the combination shown in FIG. 10 is the same as that described in connection with FIGS. 7 and 8. However, instead of being mounted intracavity, it is mounted extracavity due to the higher peak powers generated. An optical reflector 123 is positioned by holder 48 to act as an output reflector for the linear cavity of the dye laser. The output, however, is directed by three fully reflective reflectors 124 for passage through the frequency doubling arrangement. Again, the fundamental frequency is separated from the output of such frequency doubling arrangement to provide a desired output beam.

FIG. 11 illustrates a closed loop dye laser in which both its output and radiation from another source are passed through a frequency mixing or combining arrangement. The frequency mixing arrangement is the same as the frequency doubling arrangement described earlier, except that the frequency doubling crystal is replaced by a frequency mixing crystal appropriate for the frequencies to be mixed. The beam path of the closed loop optical cavity shown in FIG. 11 is the same as that illustrated in FIG. 5. The output beam from the cavity is directed via reflectors 125 to the frequency mixing arrangement. Moreover, a beam splitter 126 is positioned in the path of the pump beam 19 to reflect a portion of the same via reflectors 127 for passage through the frequency mixing arrangement along with the output beam of the dye laser.

FIG. 12 illustrates another possible combination in which a source of coherent radiation other than that provided by the pumping beam, is passed through a frequency mixing arrangement located in the cavity of a ring dye laser. In such arrangement, the beam path for the dye laser ring is basically the same as that shown in FIG. 7. A beam of coherent radiation 128 is directed by fully reflective reflectors 129 through the frequency mixing arrangement.

FIG. 13 illustrates a mode locked linear dye laser having a cavity dumping feature. The mode locking cavity is basically the same as that described in connection with FIG. 9. However, the output mirror and holder for the same is replaced by a conventional cavity dumping gate. Such gate, enclosed in FIG. 13 by phantom line block 131, will allow power build-up in the linear laser and periodic "dumping" of the same as an output beam. Such gate includes as is conventional, an electrically controlled crystal 132 positioned between reflectors 133 to change the beam path from one in which reflector 133 returns the beam to the remainder of the optical cavity for power buildup to one in which reflector 133 "dumps" such beam through prism 134 and thereby provides an output beam.

The various combinations of beam paths, beam conditioning devices, etc., set forth above are included to illustrate the extreme versatility provided by the modular nature of the instant invention, but not to be limiting. In other words, many other and different combinations also can be provided. It is therefore intended that the coverage afforded applicant be limited only by the scope of the claims and their equivalent language.

I claim:

1. A dye laser including:
  A. a first base plate;
  B. means for furnishing a liquid dye capable of lasing at a selected location contiguous to said base plate;
  C. means for focusing to said selected location, a beam of pumping radiation creating a population inversion in said dye; and
  D. means mounted on said first base plate positioning a pair of optical reflectors respectively on opposite sides of said selected location to reflect optical radiation emitted by said liquid dye, said positioning means for adjusting the orientation of said optical reflectors relative to one another between a first position in which the optical path between said reflectors defines a straight line radiation path leg of a linear laser cavity and a second position in which said reflectors define with at least one other reflector, a closed loop laser optical cavity.

2. A dye laser according to claim 1 wherein said first base plate includes means for positioning a second base plate having said one other reflector, in a predetermined relationship relative to said first base plate.

3. A dye laser according to claim 1 wherein said first base plate has affixed thereon, a holder which positions a fully reflective fourth optical reflector at a mount location different from said predetermined position to receive optical radiation from one of said pair of optical reflectors and reflect said radiation.

4. A dye laser according to claim 3 wherein said first optical reflector holder is removed from said predetermined position on said first base plate and further comprising:
  A. a reflector holder mounted on said first base plate at said mount location to position a fully reflective fourth optical reflector as aforesaid;
  B. a second base plate rigidly secured to said first base plate at a position to extend the base surface of said dye laser along the path of optical radiation reflected by said fully reflective fourth optical reflector; and
  C. another reflector holder on said second base plate at a location to position an optical reflector in the path of radiation reflected by said fourth optical reflector, which reflector holder positions in said path either a fully reflective optical reflector, or a partially transmissive optical reflector to produce an output beam.

5. A dye laser according to claim 4 wherein said other relector holder positions a laser reflector in said path which transmits a portion of radiation received thereby to form an output beam while reflecting another portion of said radiation to the one of said pair of optical reflectors on said first base plate which does not reflect said optical radiation to said fourth reflector, to thereby provide a closed loop optical cavity.

6. A dye laser according to claim 5 wherein said closed loop optical cavity includes at least three legs and has a plurality of optical radiation conditioning means which intercept and transmit lasing radiation within said optical cavity and which change the path of lasing radiation. which conditioning means are all located in the same leg of said closed loop.

7. A dye laser according to claim 5 further including means for detecting thermal changes in said first and second base plates;
  means for changing the path length of lasing radiation in said closed loop optical cavity; and
  means for controlling said cavity length changing means to compensate for variations in length caused by thermal changes detected in at least one of said base plates.

8. A dye laser according to claim 3 wherein said first optical reflector holder is removed from said predetermined position on said first base plate and further comprising:
  A. a reflector holder mounted on said first base plate at said mount location to position a fully reflective fourth optical reflector as aforesaid;
  B. a second base plate rigidly secured to said first base plate at a position to extend the base surface of said dye laser along the path of optical radiation reflected by said fully reflective fourth optical reflector;
  C. another reflector holder on said second base plate at a location to mount a laser output reflector; and
  D. a third base plate positioned intermediate of said first and second base plates and rigidly secured thereto to further extend said base surface along said path
  E. means mounted on said second base plate for forming an output beam from said dye laser.

9. A dye laser according to claim 3 further including a means for converting at least a portion of said lasing radiation to radiation having essentially twice its frequency, including a frequency doubling crystal, means for hermetically isolating the radiation input and output faces of said crystal, and means for evacuating said hermetic isolation means to provide vacuum isolation of said faces.

10. A dye laser including:
  A. a dye laser resonator structure;
  B. means for furnishing a liquid dye capable of lasing at a selected location contiguous to said structure;
  C. means for focussing to said selected location, a beam of pumping radiation creating a population inversion in said dye;
  D. means mounted on said resonator structure positioning a pair of optical reflectors respectively on opposite sides of said selected location to reflect optical radiation emitted by said liquid dye;
  E. optical reflector means mounted on said structure for forming with said pair of optical reflectors, a closed loop optical cavity for lasing radiation;

F. means for changing the path length of lasing radiation in said closed loop optical cavity;

G. means for detecting thermal changes in said optical resonator structure; and

H. means for controlling said path length changing means to compensate for variations in length caused by thermal changes detected in said optical resonator structure.

11. A dye laser including

A. a dye laser resonator structure;

B. means for furnishing a liquid dye capable of lasing at a selected location contiguous to said structure;

C. means for focussing to said selected location, a beam of pumping radiation creating a population inversion in said dye;

D. means mounted on said resonator structure positioning a pair of optical reflectors respectively on opposite sides of said selected location to reflect optical radiation emitted by said liquid dye;

E. optical reflector means mounted on said structure for forming with said pair of optical reflectors, a closed loop optical cavity for lasing radiation having a plurality of straight line radiation path legs; and F. a plurality of optical radiation conditioning means which intercept and transmit lasing radiation within said optical cavity that change the path of lasing radiation, which conditioning devices are all located in the same leg of said closed loop.

12. A dye laser including

A. a dye laser resonator structure;

B. means for furnishing a liquid dye capable of lasing at a selected location contiguous to said structure;

C. means for focussing to said selected location, a beam of pumping radiation creating a population inversion in said dye;

D. means mounted on said resonator structure positioning a pair of optical reflectors respectively on opposite sides of said selected location to reflect optical radiation emitted by said liquid dye; and E. means for intercepting lasing radiation produced by said dye laser and converting at least a portion of the intercepted radiation to radiation having essentially twice the frequency of the intercepted radiation, which means includes:

(1) a frequency doubling crystal positioned to intercept said lasing radiation;

(2) means for hermetically isolating the radiaiton input and output faces of said crystal; and (3) means for evacuating said hermetic isolation means to provide vacuum isolation of said faces.

13. A dye laser including:

A. a dye laser resonator structure;

B. means for furnishing a liquid dye capable of lasing at a selected location contiguous to said structure;

C. means for focussing to said selected location, a beam of pumping radiation creating a population inversion in said dye;

D. means mounted on said resonator structure positioning a pair of optical reflectors respectively on opposite sides of said selected location to reflect optical radiation emitted by said liquid dye; and E. means for intercepting lasing radiation produced by said dye laser and converting at least a portion of the intercepted radiation to radiation having essentially twice the frequency of the intercepted radiation, which means is positioned intracavity of said dye laser.

* * * * *